(12) United States Patent
Kogure et al.

(10) Patent No.: US 6,268,722 B1
(45) Date of Patent: Jul. 31, 2001

(54) ROTATION ANGLE SENSOR HAVING IMPROVED MAGNETIC LEAKAGE EFFECT PREVENTION AND REDUCTION IN PARTS

(75) Inventors: Yoshihiro Kogure; Hirotsugu Nakazawa, both of Gunma (JP)

(73) Assignee: Unisia Jecs Corporation, Isesaki (JP)

( * ) Notice: Subject to any disclaimer, the term of this patent is extended or adjusted under 35 U.S.C. 154(b) by 0 days.

(21) Appl. No.: 09/271,161

(22) Filed: Mar. 17, 1999

(30) Foreign Application Priority Data

Mar. 17, 1998 (JP) .................................................. 10-088111

(51) Int. Cl.⁷ ........................................................ G01B 7/30
(52) U.S. Cl. .................................. 324/207.25; 324/207.2; 324/207.12
(58) Field of Search .......................... 324/207.2, 207.25, 324/207.21, 207.22, 207.12; 338/32 R, 32 M (56) References Cited

U.S. PATENT DOCUMENTS

| 4,789,826 | * | 12/1988 | Willett ................................ 324/207.2 |
| 5,811,968 | * | 9/1998 | Nakazawa et al. ................. 324/207.2 |
| 5,889,400 | * | 3/1999 | Nakazawa ........................... 324/207.2 |

FOREIGN PATENT DOCUMENTS

| 197 00 046 A1 | 7/1997 | (DE) . |
| 197 19 019 A1 | 11/1997 | (DE) . |

\* cited by examiner

*Primary Examiner*—Christine Oda
*Assistant Examiner*—Subhash Zaveri
(74) *Attorney, Agent, or Firm*—Foley & Lardner (57) ABSTRACT

A rotation angle sensor is provided, including a casing, and a magnet positioned in the casing. The magnet has a first magnetic pole end and a second magnetic pole end. First and second yokes are positioned at a first predetermined space relative to the first magnetic pole end of the magnet, and a third yoke is positioned at a predetermined space relative to the second magnetic pole end of the magnet. The third yoke is further positioned between the magnet and an extending portion of the first yoke, and is also positioned between the magnet and an extending portion of the second yoke. A first signal output element, which is positioned between the third yoke and the extended portion of the first yoke, outputs a first signal corresponding to an area ratio between the magnet and the first yoke. A second signal output element, which is positioned between the third yoke and the extended portion of the second yoke, outputs a second signal corresponding to an area ratio between the magnet and the second yoke. In addition, a magnetic shielding portion is positioned above the magnet, wherein the magnetic shielding portion interrupts leakage magnet flux of the magnet, and wherein the magnetic shielding portion and the third yoke are integrally formed of a single-piece construction.

20 Claims, 6 Drawing Sheets

ROTATION ANGLE SENSOR HAVING IMPROVED MAGNETIC LEAKAGE EFFECT PREVENTION AND REDUCTION IN PARTS

BACKGROUND OF THE INVENTION

1. Field of the Invention

The present invention relates in general to sensors for sensing a rotation angle, and more particularly to sensors that sense a rotation angle or open degree of a throttle valve installed in an air intake manifold of an internal combustion engine.

2. Description of the Background Art

Generally speaking, a throttle valve is installed in an air intake manifold of an internal combustion engine, and a rotation angle sensor detects an open angle of the throttle valve. A detecting signal of the rotation angle sensor is routed to an engine control unit, which signal indicates an intake air amount of the engine. The engine control unit calculates a fuel injection amount corresponding to the intake air amount. The rotation angle sensor has a potentiometer, which is comprised of a resistant element and a brush for detecting the open angle of the throttle valve. The brush is connected with a rotational shaft (a throttle shaft). When the brush moves on the resistant element, the open angle of the throttle valve can be detected by a resistant value change of the resistant element. However, because the brush may be isolated from the resistant element, the detecting signal of the rotation angle sensor has the potential for being suddenly interrupted. Also, when the brush or the resistant element is used for a long period of time, the rotation angle sensor cannot keep its durability and life because of the wearing away of the brush or the resistant element.

A Japanese Patent Application First Publication No. Heisei 9-189509, published on Jul. 22, 1997, exemplifies a previously proposed rotation angle sensor with three poles, having a first yoke, a second yoke, and a third yoke surrounding a magnet, and a first Hall element installed between the first yoke and the third yoke, and a second Hall element installed between the second yoke and the third yoke.

Figure 9:
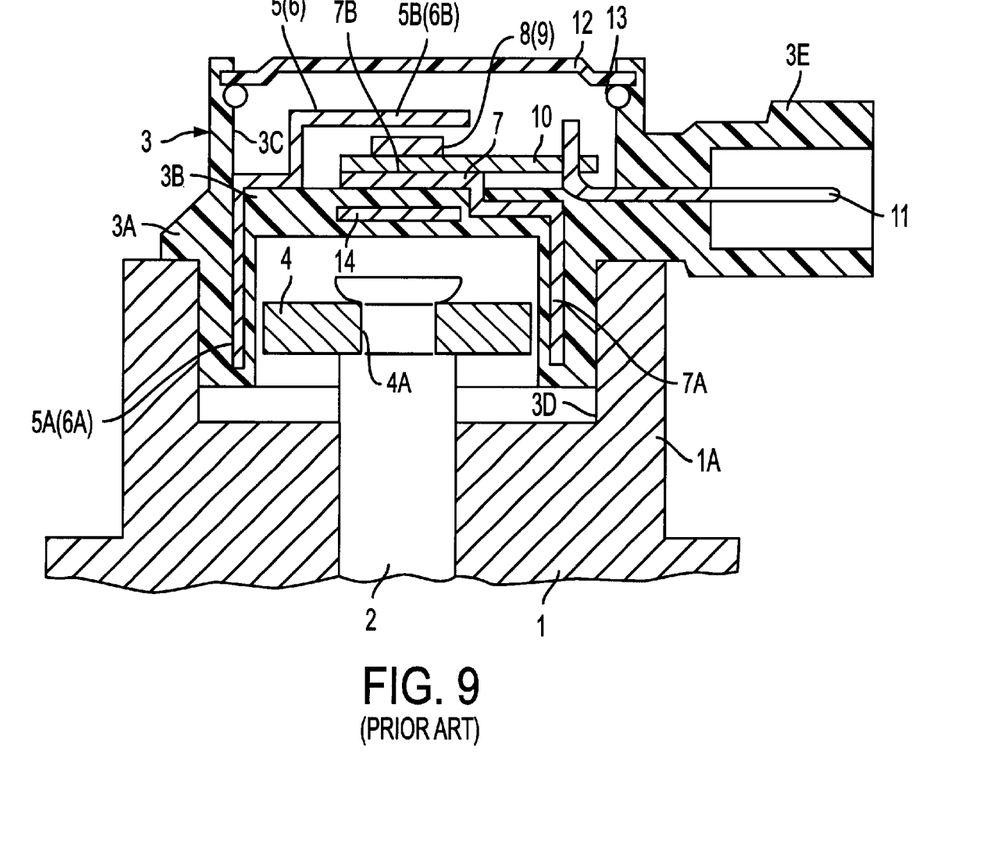
FIG. 9 is a vertical sectional view of a rotation angle sensor according to a prior art.

In the disclosed Japanese Patent Application First Publication, the rotation angle sensor is shown in FIG. 9. A throttle body 1 has a throttle valve (not shown) which rotates with a valve shaft 2. The throttle body 1 has also a fit portion 1A, which forms a cylindrical shape surrounding the projection end of the valve shaft 2. The fit portion 1A is fixed to a cylindrical portion 3A of a yoke mounting member 3. The valve shaft 2 is made of a high strength metal material, which is installed on the bearings in the throttle body 1.

The yoke mounting member 3 includes a casing in conjunction with the throttle body 1, which has the cylindrical portion 3A opening in the downward direction, a partition portion 3B covering on the top end of the cylindrical portion 3A, a circuit board installing space 3C on the upper portion of the partition portion 3B, a magnet installing space 3D on the lower portion of the partition portion 3B, and a connector portion 3E projecting in the outside diameter direction of the cylindrical portion 3A.

A magnet 4 is installed in the magnet installing space 3D of the yoke mounting member 3. The magnet has circular ended portions in the lengthwise direction, parallel ended portions in the width direction, and a through hole 4A extending in the axial direction of the valve shaft 2. By inserting and crimping the projecting end of the valve shaft 2 into the through hole 4A, the magnet 4 is fixed to the valve shaft 2.

The first yoke 5 is installed in the yoke-mounting member 3. The first yoke 5 has a circular magnet portion 5A opposed to the circular portions of the magnet 4, and an extending portion 5B extending from the magnet portion 5A to the circuit board installing space 3C, and shaped like a letter L. The extending portion 5B covers a Hall element 8 from above. The extending portion 5B of the first yoke 5 leads a magnetic flux from the magnet 4 to the first Hall element 8.

The second yoke 6 is installed in the yoke-mounting member 3. The second yoke 6 has a circular magnet portion 6A opposed to the circular portions of the magnet 4, and an extending portion 6B extending from the magnet portion 6A to the circuit board installing space 3C, and shaped like a letter L. The extending portion 6B covers a Hall element 9 from above. The extending portion 6B of the second yoke 6 leads a magnetic flux from the magnet 4 to the second Hall element 9.

The third yoke 7 is installed in the yoke-mounting member 3. The third yoke 7 has a circular magnet portion 7A opposed to the circular portions of the magnet 4. An extending portion 7B extends from the magnet portion 7A along the surface of a circuit board 10 on the partition portion 3B of the yoke mounting portion 3, which extending portion 7B is installed below the extending portions 5B, 6B.

The first Hall element 8 for a first signal output means is installed on the circuit board 10, which circuit board is positioned between the extending portion 5B of the first yoke 5 and the extending portion 7B of the third yoke 7. The first signal is output proportional to a magnetic flux density through a first closed flux path which is comprised of the magnet 4, the first yoke 5, and the third yoke 7.

The second Hall element 9 for a second signal output means is installed on the circuit board 10, which stands between the extending portion 6B of the second yoke 6 and the extending portion 7B of the third yoke 7. The second signal is output proportional to a magnetic flux density through a second closed flux path which is comprised of the magnet 4, the second yoke 6, and the third yoke 7.

The circuit board 10 is installed in the circuit board installing space 3C, which includes an insulating material such as a ceramic. The Hall elements 8,9 are positioned on the circuit board 10. The circuit board 10 is connected to the end of more than one terminal 11, which extends toward the connector 3E. The circuit board 10 is connected to a signal processing circuit (not shown) by the terminal 11.

The circuit installing space 3C of the yoke-mounting member 3 is sealed with a cover 12, which may be a resin plate. Packing 13 is installed between the cover 12 and the circuit installing space 3C, which packing includes an elastic member.

A magnetic shielding plate 14 is buried in the partition portion 3B of the yoke mounting member 3, which interrupts a leakage flux and reduces the effect of a leakage magnetic field to the Hall elements 8,9.

In the above-mentioned the rotation angle sensor, when the valve shaft 2 rotates to the throttle valve openings, the magnet 4 which is fixed on the valve shaft 2 also moves. Then, because each area ratio of the circular portion of the magnet 4 relative to the circular magnet portion 5A or the circular portion of the magnet 4 relative to the circular magnet portion 6A changes, the magnetic flux density through the yoke 5,6 changes.

Each Hall element 8,9 outputs a signal proportional to the magnetic flux density to the signal processing circuit through the circuit board 10 and terminal 11. Therefore, the valve shaft opening is detected by the signal processing circuit.

Incidentally, in the above-mentioned rotation angle sensor, because the magnetic shielding plate 14 is buried in the partition portion 3B of the yoke mounting member 3, this requires preparations for many parts. Also, when the yoke-mounting member 3 is made, because the magnetic shielding plate 14 must be molded in the partition portion 3B, it causes inconvenience in the workability.

In addition, the Hall elements 8,9 are contained on the circuit board 10 of the circuit installing space 3C, which is located above the partition portion 3B of the yoke mounting member 3. When the yoke-mounting member 3 is mounted on the cylindrical fit portion 1A of the throttle body 1, it results in an undesirably increased size of the sensor.

SUMMARY OF THE INVENTION

It is therefore an object of the present invention to provide an improved rotation angle sensor which can reduce the effect of the leakage magnetic field and improve the detecting sensitivity of the throttle valve opening and be miniaturized by reducing the number of parts.

It is also an object of the invention to provide a yoke for a rotation angle sensor, which has a magnetic shielding plate and third yoke in one piece.

In order to achieve these and other objects, a rotation angle sensor is provided, including a casing and a magnet positioned in the casing. The magnet has a first magnetic pole end and a second magnetic pole end, and first and second yokes are positioned at a first predetermined space relative to the first magnetic pole end of the magnet. A third yoke positioned at a predetermined space relative to the second magnetic pole end of the magnet, the third yoke further positioned between the magnet and an extending portion of the first yoke, and also positioned between the magnet and an extending portion of the second yoke. A first signal output element is positioned between the third yoke and the extended portion of the first yoke, the first signal output element for outputting a first signal corresponding to an area ratio between the magnet and the first yoke. A second signal output element is positioned between the third yoke and the extended portion of the second yoke, the second signal output element for outputting a second signal corresponding to an area ratio between the magnet and the second yoke. A magnetic shielding portion is positioned above the magnet, wherein the magnetic shielding portion interrupts leakage magnet flux of the magnet, and wherein the magnetic shielding portion and the third yoke are integrally formed of a single-piece construction.

In a further aspect of the present invention, a yoke construction for a rotation angle sensor is provided, including a magnet has a first magnetic pole end and a second magnetic pole end. First yoke and second yokes-are positioned at a first predetermined space relative to the first magnetic pole end of the magnet. A third yoke has a circular magnet portion, which circular magnet portion of the third yoke is positioned at a second predetermined space relative to second magnetic pole end of the magnet. A magnetic shielding portion positioned above the magnet, the magnetic shielding portion has a substantially semicircular shape.

In a further aspect of the present invention, a yoke construction for a rotation angle sensor is provided, including a magnet has a first magnetic pole end and a second magnetic pole end. A first yoke and a second yoke are positioned at a first predetermined space relative to the first magnetic pole end of the magnet. A third yoke has a circular magnet portion, which circular magnet portion of the third yoke is positioned at a second predetermined space relative to second magnetic pole end of the magnet. A magnetic shielding portion is positioned above the magnet, and the magnetic shielding portion has a substantially U shape and includes a notch as a shaft inserting portion.

In a further aspect of the present invention, a rotation angle sensor is provided, including a casing, and a magnet is positioned in the casing, said magnet having a first magnetic pole end and a second magnetic pole end. First and second yokes are positioned at a first predetermined space relative to the first magnetic pole end of the magnet. A third yoke is positioned at a second predetermined space relative to the second magnetic pole end of the magnet. Each of the first and second yokes includes a circular magnet portion and an extending magnet portion. Each the extending magnet portion is positioned at a greater radial distance from the magnet than each the circular magnet portions, respectively.

As a result, the improved rotation angle sensor can reduce the effect of the leakage magnetic field and improve the detecting sensitivity of the throttle valve opening and be miniaturized by reducing the number of parts.

DETAILED DESCRIPTION OF THE PREFERRED EMBODIMENTS

A more detailed description of embodiments of the present invention is given below. A first embodiment shows a rotation angle sensor as shown in FIGS. 1–4.

Figure 1:
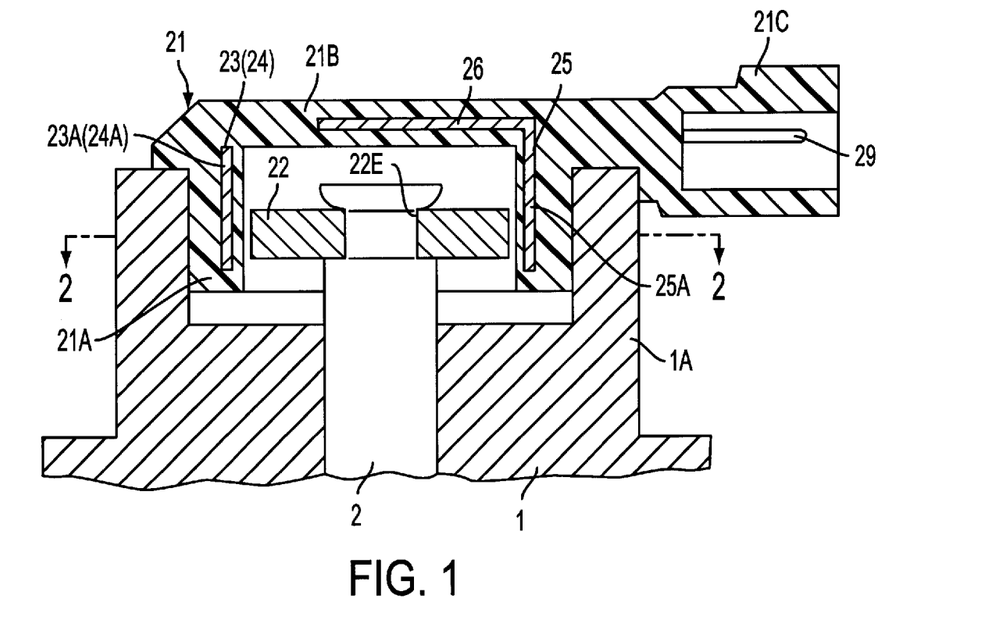
FIG. 1 is a vertical sectional view of the rotation angle sensor according to a first embodiment of the present invention.

A yoke-mounting member 21 forms the outside shape of the rotation angle sensor, which includes a casing in conjunction with throttle body 1. The yoke mounting member 21 has a cylindrical portion 21A opening in the downward direction, a partition portion 21B covering on the top end of the cylindrical portion 21A, a connector portion 21C projecting from the outside diameter direction of the cylindrical portion 21A.

A magnet 22 is installed in the cylindrical portion 21A. The magnet 22 has magnetic poles in both sides of the lengthwise direction. Also, the magnet 22 has circular ended portions 22A, 22B in the lengthwise direction, parallel ended portions 22C, 22D in the width direction, and a through-Hall 22E extending in the axial direction of the valve shaft 2, as shown FIG. 2. By inserting and crimping the projection end of a valve shaft 2 into the through-Hall 22E, the magnet 22 is fixed to the valve shaft 2.

A first yoke 23 is installed in the yoke-mounting member 21. The first yoke 23 has a circular magnet portion 23A extending at an angle, which has a constant clearance relative to the circular ended portion 22A of the magnet 22. The first yoke 23 also has an extending portion 23B extending from the end of the circular magnet portion 23A in a direction along the perimeter to a circular magnet portion 25A of a third yoke 25, as shown from FIGS. 2–4. The tip of the extending portion 23B is positioned relative to the circular magnet portion 25A of the third yoke 25 in the direction along the outside diameter. The extending portion 23B of the first yoke 23 leads a magnetic flux from the magnet 22 to a first Hall element 27.

Figure 2:
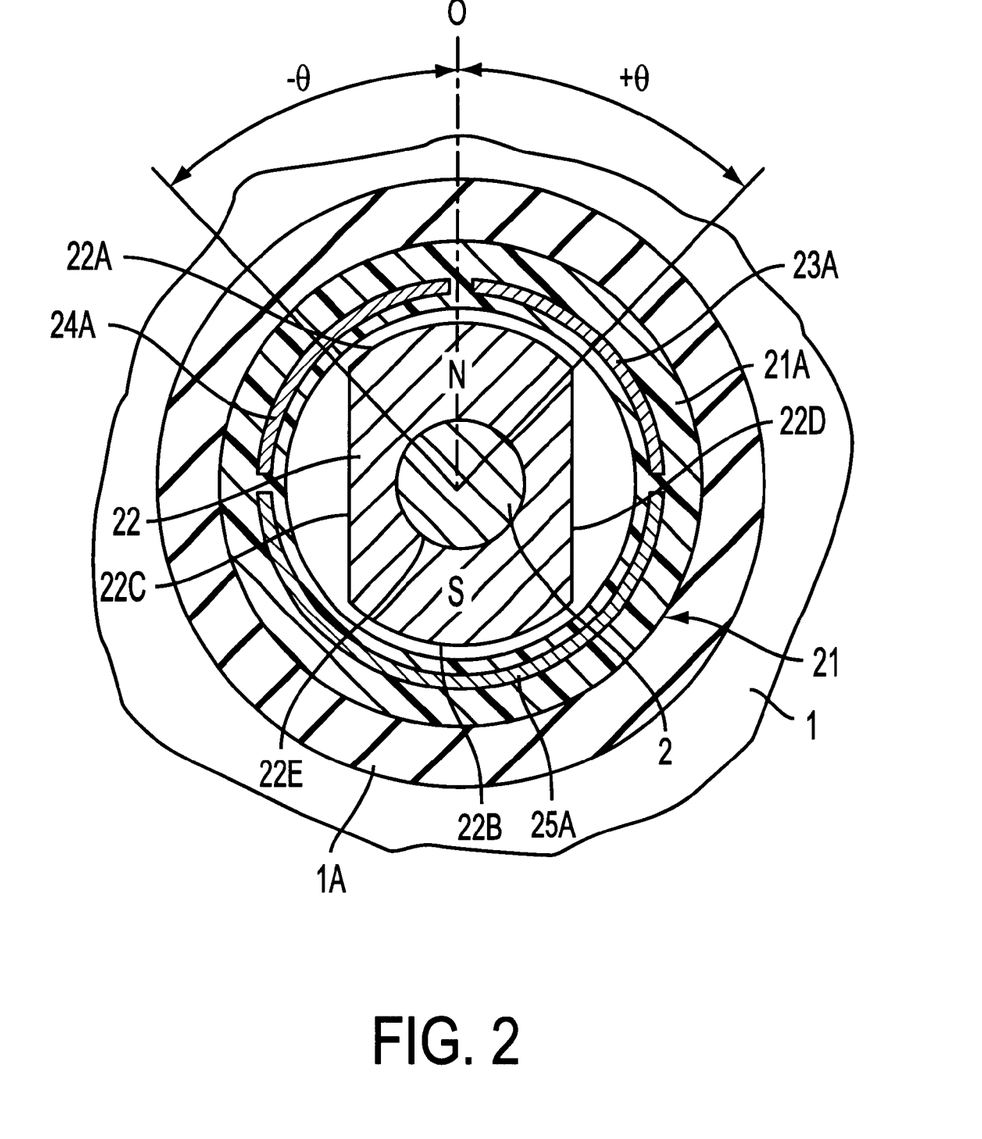
FIG. 2 is a horizontal sectional view in the direction of arrows II—II FIG. 1.
Figure 3:
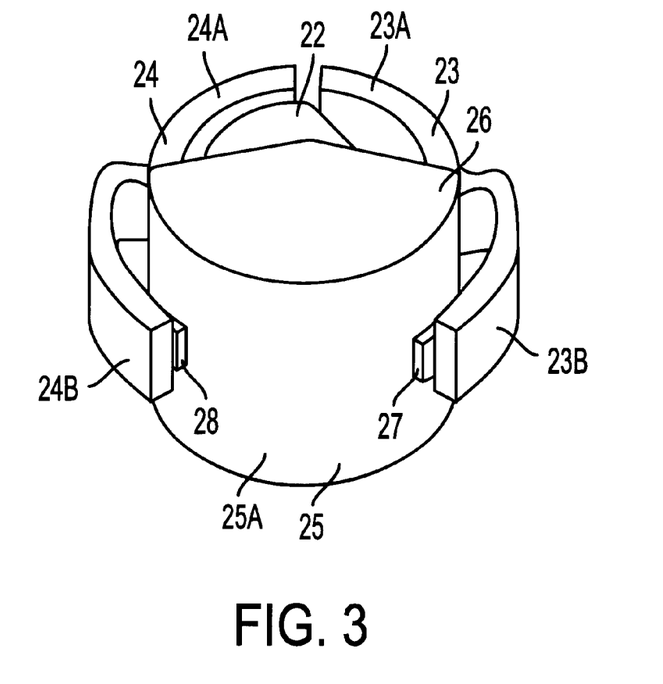
FIG. 3 is a perspective view of the first yoke, the second yoke, the third yoke, and the magnet according to the first embodiment of the present invention.
Figure 4:
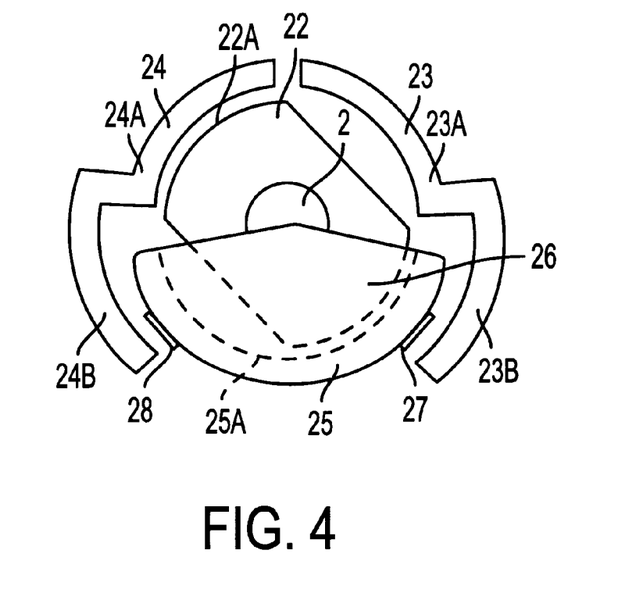
FIG. 4 is a plan view of the first yoke, the second yoke, the third yoke, and the magnet according to the first embodiment of the present invention.

A second yoke 24 is installed in the yoke-mounting member 21. The second yoke 24 has a circular magnet portion 24A extending at an angle, which has a constant clearance relative to the circular ended portion 22A of the magnet 22. The second yoke 24 also has an extending portion 24B extending from the end of the circular magnet portion 24A in a direction along the perimeter to the circular magnet portion 25A of the third yoke 25. The tip of the extending portion 24B is positioned relative to the circular magnet portion 25A of the third yoke 25 in the direction along the outside diameter. The extending portion 24B of the second yoke 24 leads a magnetic flux from the magnet 22 to a second Hall element 28.

The third yoke 25 is buried in the cylindrical portion 21A of the yoke mounting member 21, and is kept at a slight clearance to circular magnet portions 23A, 24A in the direction of the perimeter. The third yoke 25 has the circular magnet portion 25A expanding approximately 180-degree.

When the central portion of the circular ended portion 22A is positioned at a midpoint between the circular magnet portion 23A and the circular magnet portion 24A, a rotation angle $\pm\Theta$ of the magnet 22 (the valve shaft 2) shows a "0" point as shown FIG. 2. When the magnet 22 rotates to the right, the rotation angle shows a positive direction (+$\Theta$). When the magnet 22 rotates to the left, the rotation angle shows a negative direction (−$\Theta$). The magnet 22 (the valve shaft 2) can rotate ±45-degree, and when the rotation angle $\Theta$ is +45 degree, it corresponds to a maximum opening of the throttle valve.

A magnetic shielding plate 26 and the third yoke 25 have a single-piece construction. The magnetic shielding plate 26 is coupled to one end of the circular magnet portion 25A in the direction of the length, and forms a half-circle (a fan-shape). The magnetic shielding plate 26 reduces the effect of a leakage magnet flux to the outside by passing a leakage magnet flux from the magnet 22.

The first Hall element 27 for a first signal output means is installed between the outside of the circular magnet portion 25A of the third yoke 25 and the extending portion 23B of the first yoke 23 as shown FIGS. 3,4. The first signal is output proportional to a magnetic flux density through a first closed flux path which includes the magnet 22, the first yoke 23, and the third yoke 25.

The second Hall element 28 for a second signal output means is installed between the outside of the circular magnet portion 25A of the third yoke 25 and the extending portion 24B of the second yoke 24. The second signal is output proportional to a magnetic flux density through a second closed flux path which includes the magnet 22, the second yoke 24, and the third yoke 25.

More than one terminal 29 extends in a connector portion 21C of the yoke mounting member 21, which is connected to the first Hall element 27 and the second Hall element 28 with a lead wire (not shown).

In the above-mentioned first embodiment, the rotation angle sensor has three poles which is comprised of the yokes 23, 24, and 25. When the valve shaft 2 rotates, the circular ended portion 22A of the magnet 22 rotates within rotation angles $\pm\Theta(\pm45\text{-degree})$, which is also kept a constant clearance to the circular magnet portions 23A, 24A as shown FIG. 2. The circular ended portion 22A of the magnet 22 is positioned relative to the circular magnet portion 23A,24A, and the whole of the circular ended portion 22B is positioned to the circular magnet portion 25A. Therefore, a magnet flux of the magnet 22 is lead through the first yoke 23 and the third yoke 25 to the first Hall element 27, and through the second yoke 24 and the third yoke 25 to the second Hall element 28. The first signal is output from the first Hall element 27 corresponding to the magnetic flux density through the yokes 23, 25. The second signal is output from the second Hall element 28 corresponding to the magnetic flux density through the yokes 24, 25. Furthermore, the signal processing circuit is connected to the outside by a connector portion 21C, which outputs detecting signals corresponding to rotation angle$\pm\Theta$ by manipulating the first signal and the second signal, and therefore can detect rotation angles$\pm\Theta$ of the valve shaft 2.

Also, in the above-mentioned first embodiment, the magnetic shielding plate 26 and the circular magnet portion 25A of the third yoke 25 have a single-piece construction. Since the magnetic shielding plate 26 is buried in the partition portion 21B of the yoke-mounting member 21, this eliminates the need of the magnetic shielding plate 14 aside from the third yoke 7 as shown the prior art. This means a reduced number of parts, and improves the convenience in the workability.

On the other hand, because the magnetic shielding plate 26 can suppress the leakage flux of the magnet 22 to the first yoke 23 or the second yoke 24, each of the first signal and the second signal from Hall elements 27,28 is not affected by fluctuations of the leakage flux.

Also, since the first Hall element 27 is installed between the outside of the circular magnet portion 25A of the third yoke 25 and the extending portion 23B of the first yoke 23, and the second Hall element 28 is installed between the outside of the circular magnet portion 25A of the third yoke 25 and the extending portion 24B of the second yoke 24, the magnetic shielding plate 26 can interrupt the effect of the leakage flux to the extending portion 23B of the first yoke 23 and the extending portion 24B of the yoke 24, and can reduce the effect of the leakage flux to Hall elements 27, 28 for detecting rotation anglesie accurately.

Furthermore, since the first Hall element 27 is installed between the outside of the circular magnet portion 25A of the third yoke 25 and the extending portion 23B of the first yoke 23, and the second Hall element 28 is installed between the outside of the circular magnet portion 25A of the third yoke 25 and the extending portion 24B of the second yoke 24, the yoke mounting member 21 may be made thinner than the prior art, which installs Hall elements on the yoke mounting member. This means a reduction in size of the Hall of the rotation angle sensor.

Figure 5:
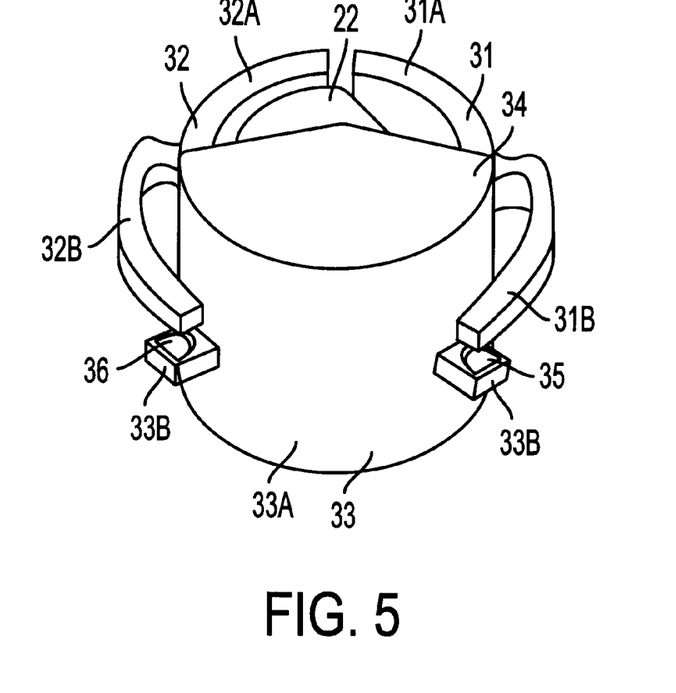
FIG. 5 is a perspective view of the first yoke, the second yoke, the third yoke, and the magnet according to a second embodiment of the present invention.
Figure 6:
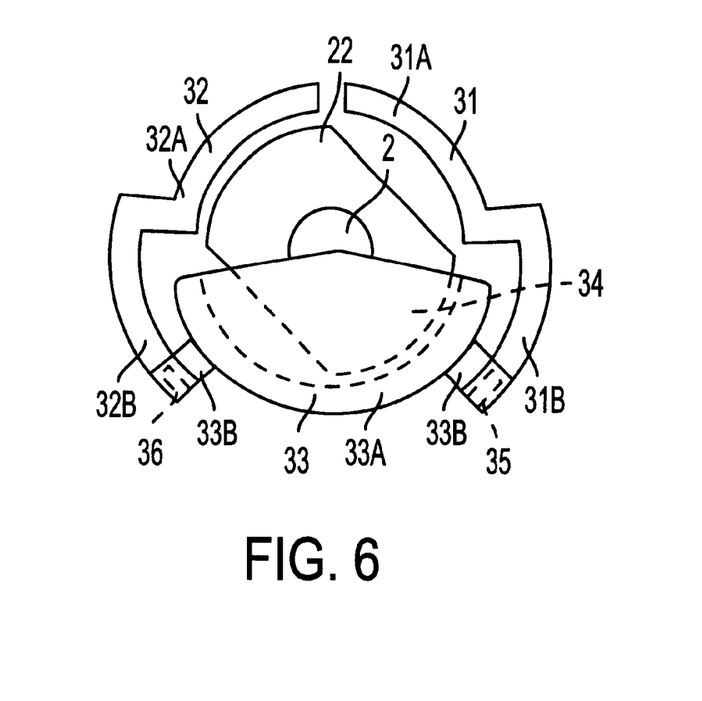
FIG. 6 is a plan view of the first yoke, the second yoke, the third yoke, and the magnet according to the second embodiment of the present invention.

In the second embodiment as shown FIGS. 5–6, the first yoke 31 has a circular magnet portion 31A and an extending portion 31B which extends from one end of the circular magnet portion 31A to and along the outside of a circular magnet portion 33A of the third yoke 33.

The second yoke 32 has a circular magnet portion 32A and an extending portion 32B which extends from one end of the circular magnet portion 32A to and along the outside of a circular magnet portion 33A of the third yoke 33.

The third yoke 33 has the circular magnet portion 33A, which is kept at a slight clearance relative to the extending portions 31B, 32B in the direction along the perimeter. The third yoke 33 also has plate projections 33B, 33B, which extend from the circular magnetic portion 33A in the direction to the perimeter of the circular magnet portion 32A. Each of the plate projections 33B, 33B extends radially to the extending portion 31B of the first yoke 31 or the extending portion 32B of the second yoke 32, offset in the axial direction.

A magnetic shielding plate 34 and the third yoke 33 have a single-piece construction. The magnetic shielding plate 34 is formed on the upper end of the circular magnet portion 33A, and has a fan-shape. The magnetic shielding plate 34 reduces the effect of a leakage magnet flux to the outside by passing a leakage magnet flux from the magnet 22.

A first Hall element 35 for a first signal output means is installed between the plate projection 33B of the third yoke 33 and the extending portion 31B of the first yoke 31. The magnet flux detecting direction of the first Hall element 35 is installed in the direction of the axis.

A second Hall element 36 for a second signal output means is installed between the plate projection 33B of the third yoke 33 and the extending portion 32B of the second yoke 32. The magnet flux detecting direction of the second Hall element 36 is installed in the direction of the axis.

In the above-mentioned second embodiment, the rotation angle sensor has similar effects as same as the first embodiment. Furthermore, because the magnetic pole direction of the magnet 22 goes straight to the magnet flux detecting direction of Hall elements 35, 36, it can reduce the effect of the leakage magnet flux better than the first embodiment.

Figure 7:
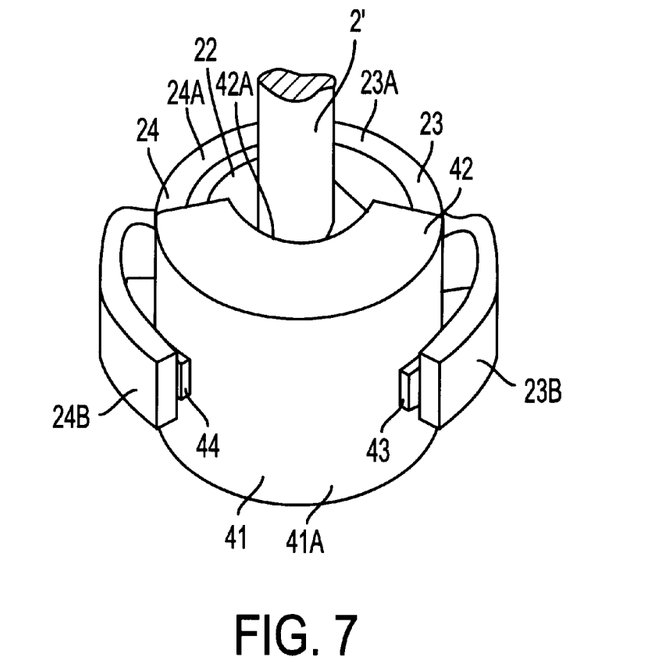
FIG. 7 is a perspective view of the first yoke, the second yoke, the third yoke, and the magnet according to a third embodiment of the present invention.

In a third embodiment shown in FIG. 7, a third yoke 41 has a circular magnet portion 41A which is kept at a slight clearance relative to the extending portion 23B of the first yoke 23 and the extending portion 24B of the second yoke 24 along the direction of the perimeter.

A magnetic shielding plate 42 and the third yoke 41 have a single-piece construction. The magnetic shielding plate 42 is formed on the upper end of the circular magnet portion 41A, which shielding plate has the shape of a letter "U" and has a notch which is a shaft inserting portion 42A. The magnetic shielding plate 42 prevents leaking of the magnetic flux of the magnet 22 to the outside.

A first Hall element 43 for the first signal output means is installed between the circular magnet portion 41A of the third yoke 41 and the extending portion 23B of the first yoke 23.

A second Hall element 44 for the second signal output means is installed between the circular magnet portion 41A of the third yoke 41 and the extending portion 24B of the second yoke 24.

In the above-mentioned third embodiment, the rotation angle sensor has similar effects as same as the first embodiment. In addition, because the magnetic shielding plate 42 has the shaft-inserting portion 42A, a valve shaft 2' is fixed on the magnet 22, and can be projected from the rotation angle sensor to the outside. Therefore, an open/close operation of the throttle valve can be made stable by installing a hysteresis generating structure on the top end of the throttle valve.

Figure 8:
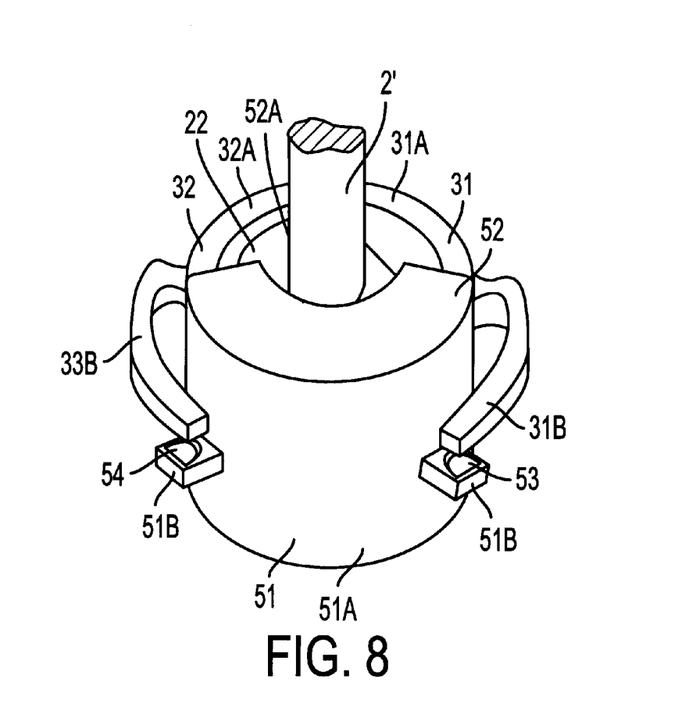
FIG. 8 is a perspective view of the first yoke, the second yoke, the third yoke, and the mag according to a fourth embodiment of the present invention.

In a fourth embodiment shown in FIG. 8, the third yoke 51 has a circular magnet portion 51A which is kept at a slight clearance relative to the circular magnet portion 31A of the first yoke 31 and the circular magnet portion 32A of the second yoke 32 in the direction of the perimeter. The third yoke 51 also has plate projections 51B, 51B extending from the circular magnet portion 51A.

A magnetic shielding plate 52 and the third yoke 51 have a single-piece construction. The magnetic shielding plate 52 is formed on the upper end of the circular magnet portion 51A, which shielding plate has the shape like a letter "U", and has a notch which is a shaft inserting portion 52A. The magnetic shielding plate 52 prevents from leaking of the magnetic flux of the magnet 22 to the outside.

A first Hall element 53 for the first signal output means is installed between the plate projection 51B of the third yoke 51 and the extending portion 31B of the first yoke 31.

A second Hall element 54 for the second signal output means is installed between the plate projection 51B of the third yoke 51 and the extending portion 32B of the second yoke 32.

In the above-mentioned fourth embodiment, the rotation angle sensor has similar effects as same as the second embodiment. In addition, because the magnetic shielding plate 52 has the shaft-inserting portion 52A, a valve shaft 2' fixed on the magnet 22, which can be projected from the rotation angle sensor to the outside. Therefore, an open/close operation of the throttle valve can be made stable by installing a hysteresis generating structure on the top end of the throttle valve.

Further, instead of comprising of the throttle body 1 and the yoke mounting member 21 for the casing in the above-mentioned embodiments, the casing may include a bottom plate which acts as a lid on the cylindrical portion 21A of the yoke mounting member 21. In this case, an open/close lever is installed on the side of the yoke mounting member 21, which can open/close relatively to the valve shaft 2.

The entire contents of Japanese Patent Application No. TOKUGANHEI 10-088111, filed Mar. 17, 1998 is incorporated herein by reference. The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. These embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rotation angle sensor, comprising:
   a) a casing;
   b) a magnet positioned in said casing, said magnet having a first magnetic pole end and a second magnetic pole end;
   c) first and second yokes positioned at a first predetermined space relative to the first magnetic pole end of said magnet;

d) a third yoke positioned at a predetermined space relative to the second magnetic pole end of said magnet, said third yoke further positioned between said magnet and an extending portion of said first yoke, and positioned between said magnet and an extending portion of said second yoke;

e) a first signal output element positioned between said third yoke and said extended portion of said first yoke, said first signal output element for outputting a first signal corresponding to an area ratio between said magnet and said first yoke, f) a second signal output element positioned between said third yoke and said extended portion of said second yoke, said second signal output element for outputting a second signal corresponding to an area ratio between said magnet and said second yoke; and g) a magnetic shielding portion positioned above said magnet, wherein said magnetic shielding portion interrupts leakage magnet flux of said magnet, wherein said magnetic shielding portion has a substantially semicircular shape and said third yoke are integrally formed of a single-piece construction.

2. The rotation angle sensor as defined in claim 1, wherein said second magnetic pole end of said magnet has a substantially circular facing, said third yoke comprises a substantially a circular magnet portion extending, at the predetermined space, relative to said circular facing of said second magnetic pole end.

3. The rotation angle sensor as defined in claim 2, wherein said first and second yokes each comprise a circular magnet portion, and said extending portions of said first and second yokes extend from said circular magnet portions of said first and second yokes, respectively, along a direction of a perimeter of said circular magnet portion of said third yoke.

4. The rotation angle sensor as defined in claim 2, wherein said circular magnet portion of said third yoke is radially positioned between said magnet and said extending portion of said first yoke, and also radially positioned between said magnet and said extending portion of said second yoke;

said first signal output element is radially positioned between said circular magnet portion of said third yoke and said first yoke; and said second signal output element is radially positioned between said circular magnet portion of said third yoke and said second yoke.

5. A yoke construction for a rotation angle sensor, comprising a) a magnet having a first magnetic pole end and a second magnetic pole end;

b) a first yoke and a second yoke positioned at a first predetermined space relative to the first magnetic pole end of said magnet;

c) a third yoke having a circular magnet portion, which circular magnet portion of said third yoke is positioned at a second predetermined space relative to second magnetic pole end of the magnet; and d) a magnetic shielding portion positioned above said magnet, said magnetic shielding portion having a substantially semicircular shape.

6. The yoke construction of claim 5, wherein said first yoke and said second yoke each have a circular magnet portion and an extending portion, said extending portion extending from one end of said circular magnet portion in a direction to said circular magnet portion of said third yoke, and spaced at a third predetermined space relative to said circular magnet portion of said third yoke.

7. The yoke construction for a rotation angle sensor as defined in claim 6, further comprising:

e) a first Hall member installed between said extending portion of the first yoke and said circular magnet portion of the third yoke;

f) a second Hall member installed between said extending portion of the second yoke and said circular magnet portion of the third yoke.

8. The yoke construction for a rotation angle sensor as defined in claim 6, further comprising:

e) at least one projection member which is positioned on said circular magnet portion of said third yoke;

f) a first Hall member installed between said projection of the third yoke and said extending portion of the first yoke;

g) a second Hall member installed between said projection of the third yoke and said extending portion of the second yoke.

9. A yoke construction for a rotation angle sensor, comprising:

a) a magnet having a first magnetic pole end and a second magnetic pole end;

b) a first yoke and a second yoke positioned at a first predetermined space relative to the first magnetic pole end of said magnet;

c) a third yoke having a circular magnet portion, which circular magnet portion of said third yoke is positioned at a second predetermined space relative to second magnetic pole end of the magnet; and d) a magnetic shielding portion positioned above said magnet, said magnetic shielding portion having a substantially U shape and including a notch as a shaft inserting portion.

10. The yoke construction for a rotation angle sensor as defined in claim 9, further comprising:

e) at least one projection member which is positioned on said circular magnet portion of said third yoke in the direction of the perimeter;

f) a first Hall member installed between said projection of the third yoke and said extending portion of the first yoke;

g) a second Hall member installed between said projection of the third yoke and said extending portion of the second yoke.

11. A rotation angle sensor, comprising:

a) a casing means;

b) a magnet means positioned in said casing means, said magnet means having a first magnetic pole end and a second magnetic pole end;

c) first and second yokes means positioned at a first predetermined space relative to the first magnetic pole end of said magnet means;

d) a third yoke means positioned at a predetermined space relative to the second magnetic pole end of said magnet means, said third yoke means further positioned between said magnet means and an extending portion of said first yoke means, and positioned between said magnet means and an extending portion of said second yoke means;

e) a first signal output means positioned between said third yoke means and said extended portion of said first yoke means, said first signal output means for outputting a first signal corresponding to an area ratio between said magnet means and said first yoke means, f) a second signal output means positioned between said third yoke means and said extended portion of said second yoke means, said second signal output means for outputting a second signal corresponding to an area ratio between said magnet means and said second yoke means; and g) a magnetic shielding portion means positioned above said magnet means, wherein said magnetic shielding portion means having a substantially semicircular shape and interrupts leakage magnet flux of said magnet means, wherein said magnetic shielding portion means and said third yoke means are integrally formed of a single-piece construction.

12. The rotation angle sensor as defined in claim 11, wherein said second magnetic pole end of said magnet means has a substantially circular facing, said third yoke means comprises a substantially a circular magnet portion extending, at the predetermined space, relative to said circular facing of said second magnetic pole end.

13. The rotation angle sensor as defined in claim 12, wherein said first and second yoke means each comprise a circular magnet portion, and said extending portions of said first and second yoke means extend from said circular magnet portions of said first and second yoke means, respectively, along a direction of a perimeter of said circular magnet portion of said third yoke means.

14. The rotation angle sensor as defined in claim 12, wherein said circular magnet portion of said third yoke means is radially positioned between said magnet means and said extending portion of said first yoke means, and also radially positioned between said magnet means and said extending portion of said second yoke means;

said first signal output means is radially positioned between said circular magnet portion of said third yoke means and said first yoke means; and said second signal output means is radially positioned between said circular magnet portion of said third yoke means and said second yoke means.

15. A rotation angle sensor, comprising:

a) a casing;

b) a magnet positioned in said casing, said magnet having a first magnetic pole end and a second magnetic pole end;

c) first and second yokes positioned at a first predetermined space relative to said first magnetic pole end of said magnet;

d) a third yoke positioned at a second predetermined space relative to said second magnetic pole end of said magnet; and e) a magnetic shielding portion has a substantally semi-circular shape, wherein each of said first and second yokes includes a circular magnet portion and an extending magnet portion, wherein each said extending magnet portion is positioned at a greater radial distance from said magnet than each said circular magnet portion, respectively, and wherein said third yoke and said magnetic shielding portion are integrally formed of a single-piece construction.

16. The rotation angle sensor of claim 15, wherein said third yoke is radially positioned between said magnet and said extending magnet portion of said first yoke, and also radially positioned between said magnet and said extending magnet portion of said second yoke.

17. The rotation angle sensor as defined in claim 1, wherein said first and second signal output elements are positioned axially below said magnet.

18. The yoke construction for a rotation angle sensor as defined in claim 7, wherein said first and second Hall members are positioned axially below said magnet.

19. The yoke construction for a rotation angle sensor as defined in claim 10, wherein said first and second Hall members are positioned axially below said magnet.

20. The rotation angle sensor as defined in claim 11, wherein said first and second signal output means are positioned axially below said magnet means.

* * * * *